June 12, 1934.  D. H. KINLOCH  1,962,959
SPOOLED FILM
Filed Jan. 9, 1933

INVENTOR-
Donald H. Kinloch
BY
ATTORNEY-

Patented June 12, 1934

1,962,959

UNITED STATES PATENT OFFICE 1,962,959

SPOOLED FILM

Donald H. Kinloch, Parlin, N. J., assignor to Du Pont Film Manufacturing Corp., New York, N. Y., a corporation of Delaware Application January 9, 1933, Serial No. 650,781

2 Claims. (Cl. 242—70)

This invention relates to means and method for spooling light-sensitive cine film.

In prior manufacture, finished light-sensitive cine film reached the packing operation as a tightly wound roll containing no spool of any sort, and as it was packed, a wooden spool about 1″ in diameter was inserted in the open center of the roll of film. This spool subsequently had to be forced out by the cameraman prior to loading his magazine, and also presented numerous other disadvantages; the wood splintered and deposited foreign particles on the sensitive surface of the film, and furthermore, any wood used required various well known impregnating treatments such as potassium permanganate or sodium carbonate solutions to reduce its tendency to fog the light-sensitive emulsion on the film. It has also been found that similar serious fogging emanations arise not only from wood spools but also from those made of compositions of rubber or paper, fibre or wood pulp and also from spools covered with lacquers and varnishes that have been applied to metal and other spools.

The small diameter of these spools also caused a considerable length of the film near the center of the roll to curl, which presented subsequent difficulties in use. Several types and sizes of spools were tried, but with no better success. Some of these spools had slots in the outer surface to engage the end of the film wound thereon.

A spool in the form of a steel sleeve was next used, which re-embodied the original 1″ diameter and which was designed to remain in the roll for use in the camera magazine. It was soon found that the edges of metal spools cut the fabric used for lining the camera magazines, and furthermore, such spools were frequently deformed during shipment or handling or whenever a roll of film was dropped.

One object of the present invention is to provide a film spool that will not fog, or contaminate with foreign matter, the light-sensitive emulsion on a roll of cinema film. A further object is to provide a method of spooling film that will free the end portion of the roll from curl and fog regardless of the thickness of the film used. An additional object is to provide a spool of durable, light weight construction that will not be subject to deformation or fracture and that will have no abrasive action on the magazines in which it is used. Other more specific objects will plainly appear from the detailed description presented herein.

Figure 1:
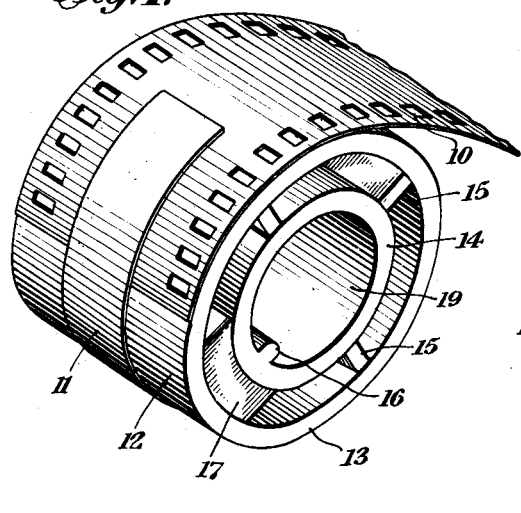
Figure 2:
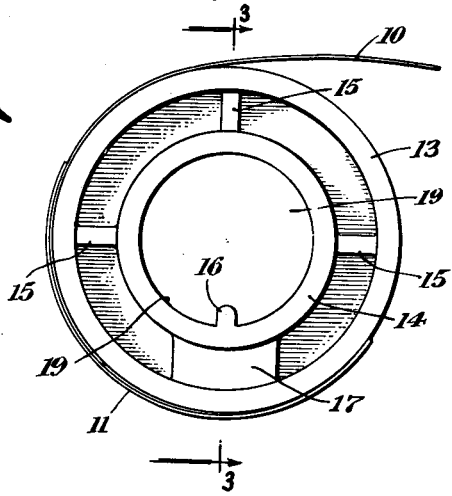
Figure 3:
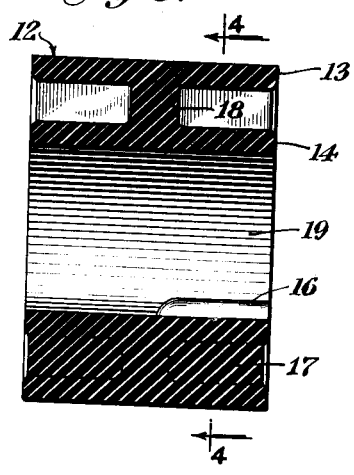
Figure 4:
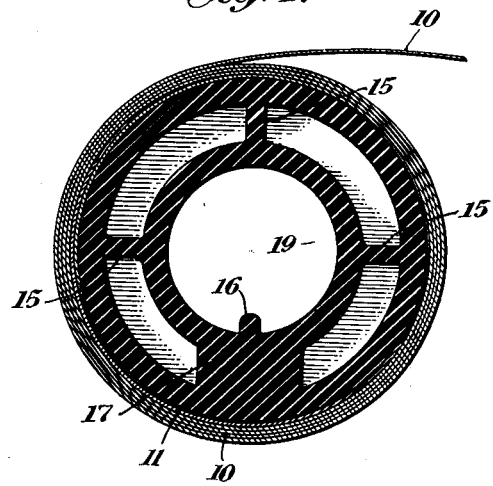

In the drawing illustrating one embodiment of the invention, by way of example, Figure 1 represents a perspective view of my improved spool, showing one end of a roll of cinema film as attached thereto by the cameraman by means of adhesive tape. Figure 2 represents an end view of the structure shown in Figure 1. Figure 3 represents a longitudinal cross section taken on the line 3—3. Figure 4 represents a transverse cross section taken on the line 4—4.

After experimentation with spools of various dimensions and materials and plastic compositions, I found that smooth surfaced, molded and seasoned spools made of synthetic or artificial resins, preferably from phenol condensation products, such as phenol formaldehyde resins, afforded many improved features long sought without success in the prior art. A variety of artificial resins may be employed; among these are cresol formaldehyde resins, urea formaldehyde resins, polyhydric alcohol polybasic acids, polystyrol, toluene sulphonamide derivatives plus formaldehyde, poly vinyl compounds, and casein compounds. Spools have been molded of cellulose esters or ethers, but in these compounds the high contents of residual solvents is objectionable. I prefer to mold my improved spool from the phenol formaldehyde resins currently known as bakelite, which furnish a tough and inexpensive spool that will present a smooth surface and which contain a low residual solvent content. This content should be further reduced by seasoning for several months or by an accelerated seasoning process which comprises heating the molded spool for approximately four hours at a temperature of approximately 160° F.

An improved construction is exemplified in the drawing wherein the spool 12 comprises an integrally molded outer annular portion 13 and inner annular portion 14 joined by a median web 18 and reinforced by axial longitudinal ribs 15. An integral key 16 is also cast in the bore 19 of the spool 12, extending axially along the bore 19 and positioned to coincide with one of the longitudinal reinforcing ribs 15, or preferably with an enlarged rib 17, designed to further strengthen the key and to protect it from damage due to accidental blows. The bore 19, and the key 16, are designed to accommodate the usual adapters for engaging spindles in the usual camera magazines.

Further study lead to the determination of the most economical ratio between the diameter of the spool 12 and the thickness of the film 10 wrapped thereon. If a spool is too small in diameter it imparts a bad curl to the center section of the roll of film, and if the spool is too large it unnecessarily and uneconomically increases the weight and bulk of the film package and reduces the film footage it is possible to use in the camera magazine. I have found that for economical curl-prevention the preferable ratio between the diameter of the spool and the thickness of the finished coated film should be in the proportion ranging from approximately 360 to 1 for some types of positive film, to 300 to 1 for some types of negative film, which affords a preferred average ratio of approximately 330 to 1.

Another disadvantage present in the old wooden spools that were equipped with a surface slot for engaging the end of the film to be wound thereon arose from the fact that a hump was formed over the point where the end of the film entered the slot in the spool. This hump caused the whole reel to become out of round, and in sound recording work this presented a serious defect that resulted in the abandonment of the slot. It was attempted to hold the end of the film on the wooden spool with a piece of adhesive tape, but it was found that the adhesive pulled the surface splinters from the wood and hence added to the foreign matter present in the film package. It was also attempted to use the adhesive strip on the metal spool, but it was found that the combination of various ingredients in the adhesive and in the metal surface increased the tendency to photographically fog the film. With my improved molded spool 12, these disadvantages are also overcome and the cameraman may employ the strip of adhesive 11, which not only permits the film 10 to be held on the spool 12 without contamination on undue distortion but also is of assistance in re-winding or back-winding operations, in loading, unloading and for various adjustments of the film in the camera magazine, all of which are extremely desirable and helpful to cameramen. The smooth surface of my improved spool affords such complete contact with the surface of the film that in packing the film at the factory it is not necessary to use the adhesive 11 as the surface contact affords sufficient bite for the film to grip the spool after a minimum number of convolutions thereon.

An added advantage is obtained by using spools of various bright colors to indicate various types of film or sensitivities of emulsion thereon; for instance, a brilliant red spool may be used to indicate a film having an emulsion with high red sensitivity and a brilliant green spool may be used to indicate high green sensitivity in a given particular roll of negative film. The plastic compositions described herein can be produced in a variety of brilliant colors, which present a distinguishable indication even in a safe light.

My invention is not limited to the particular embodiments shown and described herein, its scope being set forth in my claims as follows:—

1. In combination, a curl-preventing, non-contaminating cinema reel for a camera magazine comprising a non-fogging, non-disintegrating smooth-surfaced, one piece, seasoned spool, integrally molded from a phenol formaldehyde resin, and a roll of light-sensitive cellulose ester cine film wound thereon, the diameter of said spool bearing a ratio to the thickness of said film of approximately 330 to 1, said spool comprising an uninterrupted, smooth-surfaced, outer annular portion and an inner cored annular portion joined thereto by a median radial web and a plurality of longitudinal reinforcing ribs, one of which is positioned to reinforce a key axially extending along the bore of said inner annular portion.

2. In combination, a curl-preventing, non-contaminating cinema reel for a camera magazine comprising a non-fogging, non-disintegrating, smooth-surfaced, one piece spool, integrally molded from an artificial resin product, and a roll of light-sensitive cellulose ester cine film wound thereon, the diameter of said spool bearing a ratio to the thickness of said film of approximately 330 to 1, said spool comprising an uninterrupted smooth-surfaced outer annular portion and an inner bored annular portion joined thereto by a median radial web and a plurality of longitudinal reinforcing ribs, one cf which is enlarged and positioned to reinforce a key axially extending along the bore of said inner annular portion, said spool being colored to indicate a characteristic of said film.

DONALD H. KINLOCH.